Figure 1:
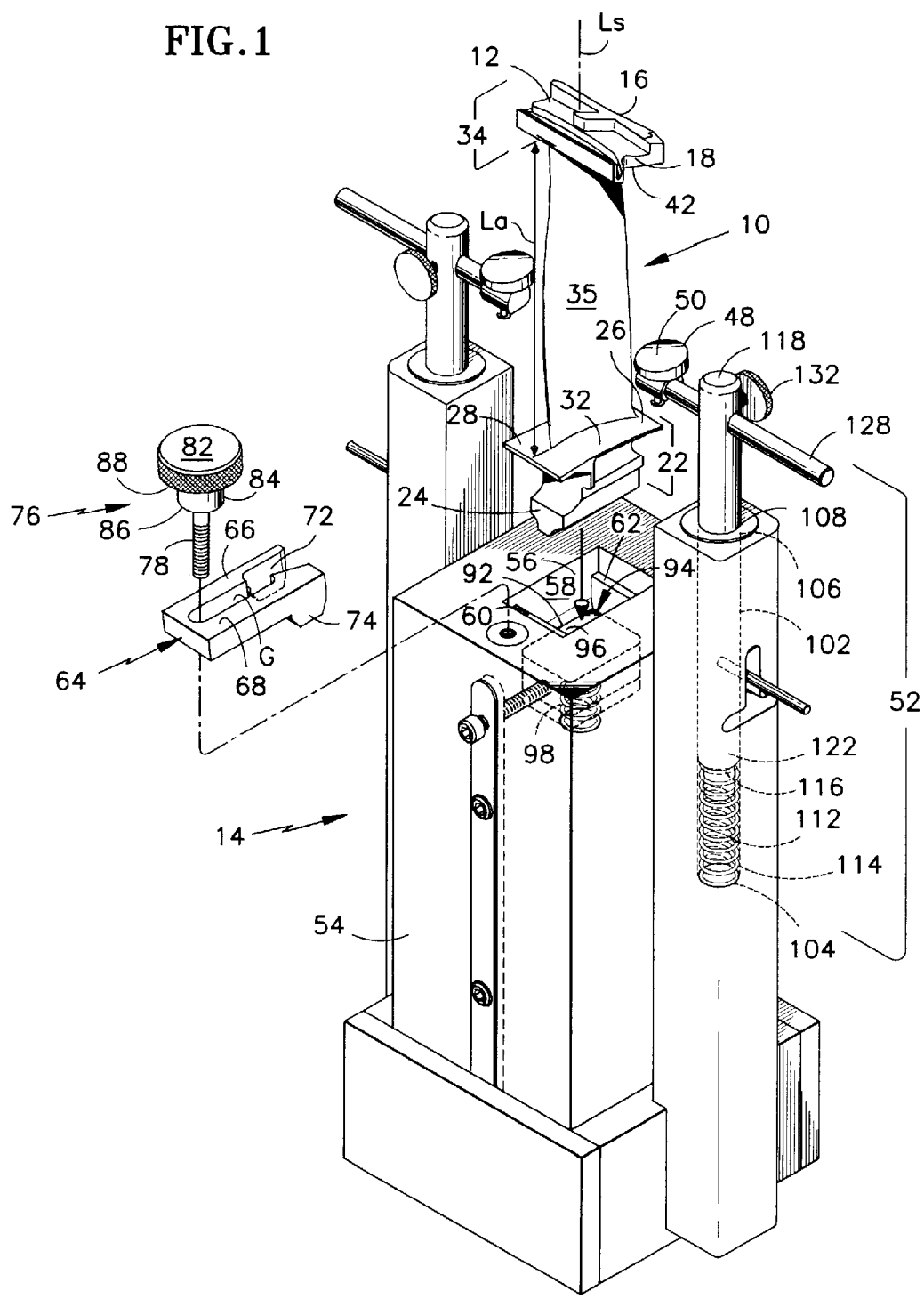

United States Patent [19]
Ittleson et al.

[11] Patent Number: 6,034,344
[45] Date of Patent: Mar. 7, 2000

[54] METHOD FOR APPLYING MATERIAL TO A FACE OF A FLOW DIRECTING ASSEMBLY FOR A GAS TURBINE ENGINE

[75] Inventors: Alan J. Ittleson, Middletown; Bryan P. Dube; Jeffrey B. Johnson, both of Wallingford; Jeffrey J. Bayer, Manchester, all of Conn.

[73] Assignee: United Technologies Corp., Hartford, Conn.

[21] Appl. No.: 08/994,678

[22] Filed: Dec. 19, 1997

[51] Int. Cl.[7] .............................. B23K 9/04; B23K 25/00; H01B 19/00
[52] U.S. Cl. ..................... 219/76.14; 219/76.15; 219/137 R; 29/889.1
[58] Field of Search ............................ 29/889.1, 889.011, 29/889.012; 219/76.14, 76.15, 137 R

[56] References Cited

U.S. PATENT DOCUMENTS

| | | | |
|---|---|---|---|
| 4,155,152 | 5/1979 | Cretella et al. | 29/156.8 |
| 4,170,473 | 10/1979 | Gerken | 219/137 R |
| 5,690,469 | 11/1997 | Deal et al. | 29/889.1 |

*Primary Examiner*—Patrick Ryan
*Assistant Examiner*—Anjan Dey
*Attorney, Agent, or Firm*—Gene D. Fleischhauer

[57] ABSTRACT

A method for applying a material to the face 16,18 of a rotor blade 10 is disclosed. The method includes blocking the flow of molten material to adjacent structure of a rotor blade by disposing a pad against the structure.

25 Claims, 4 Drawing Sheets

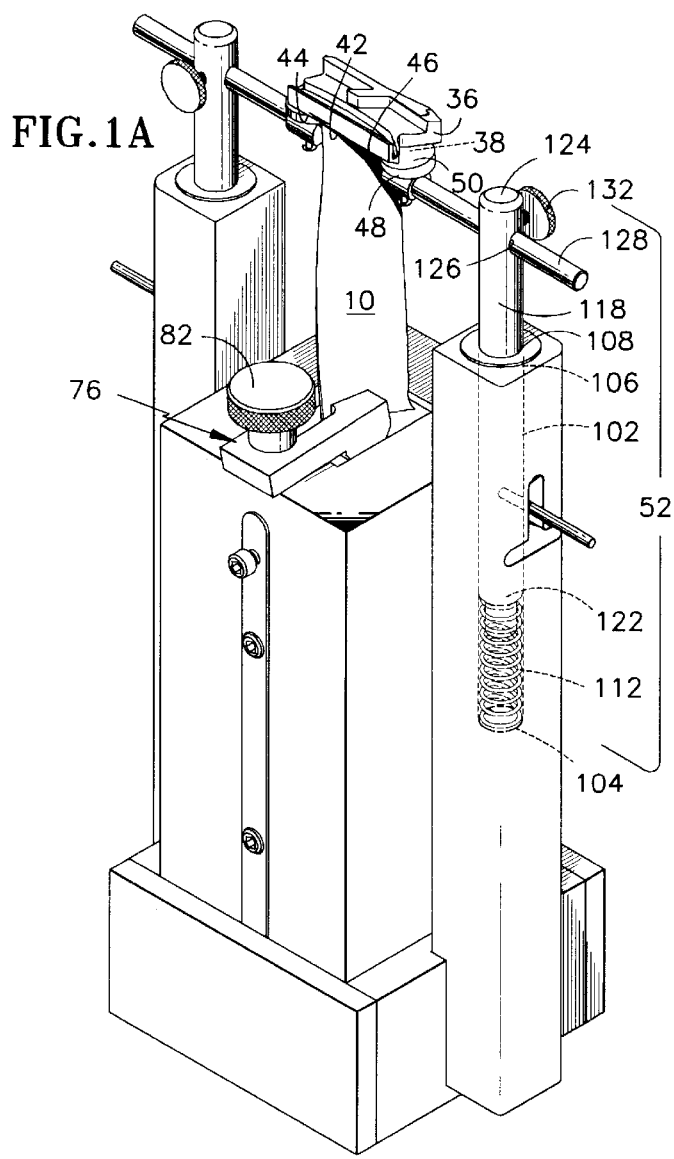
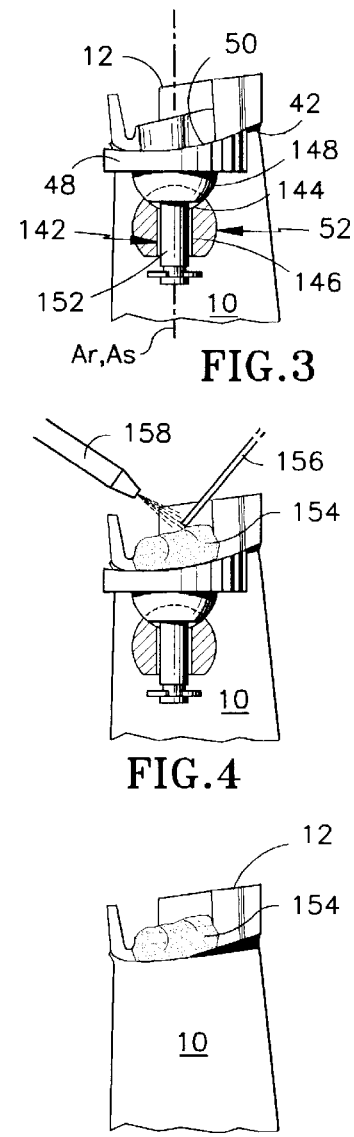

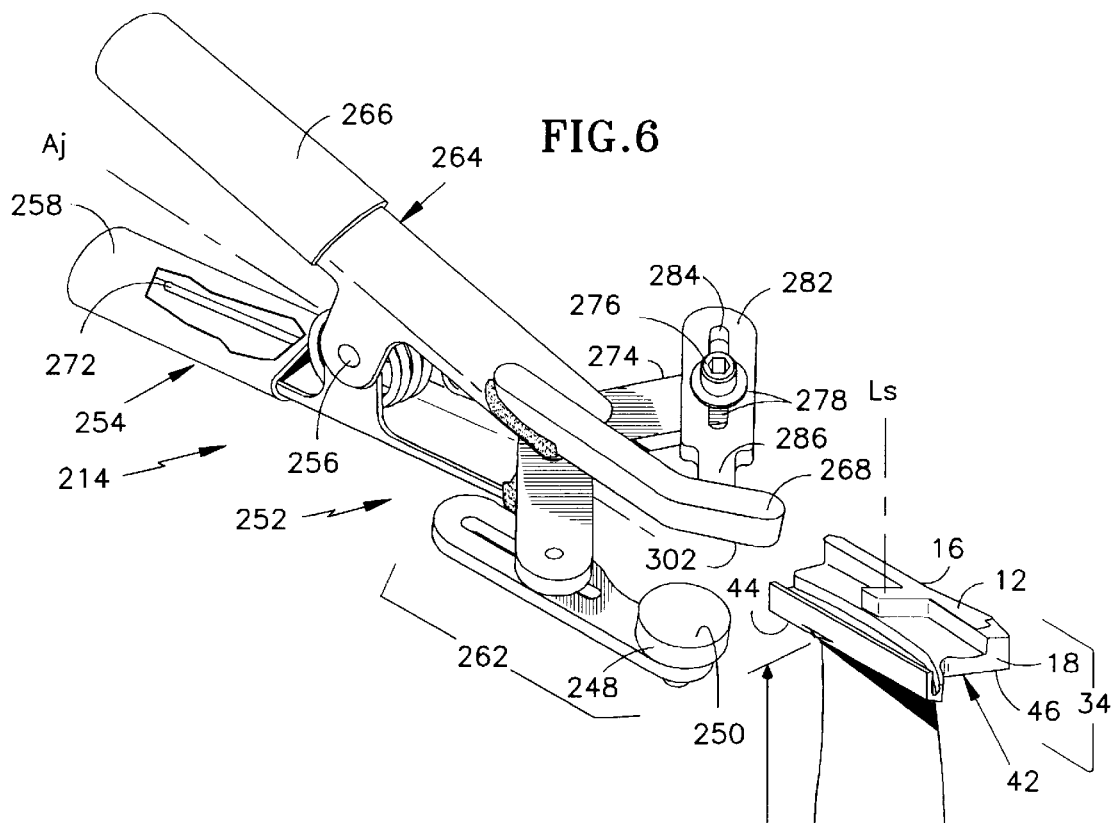
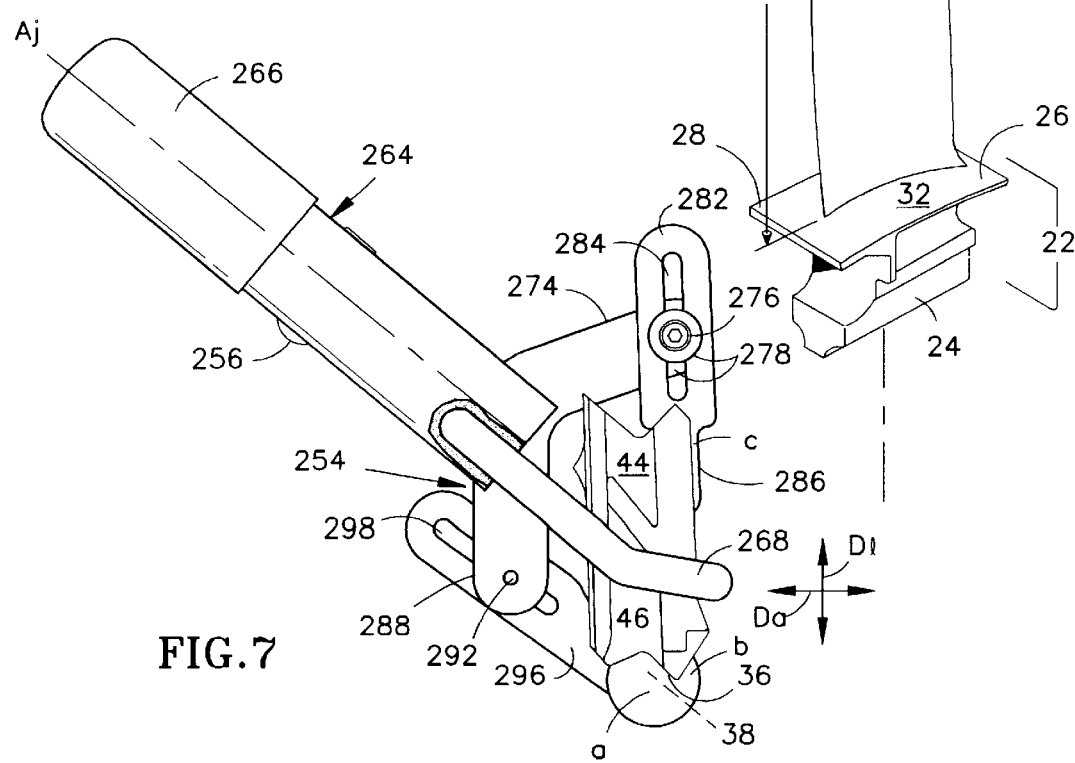

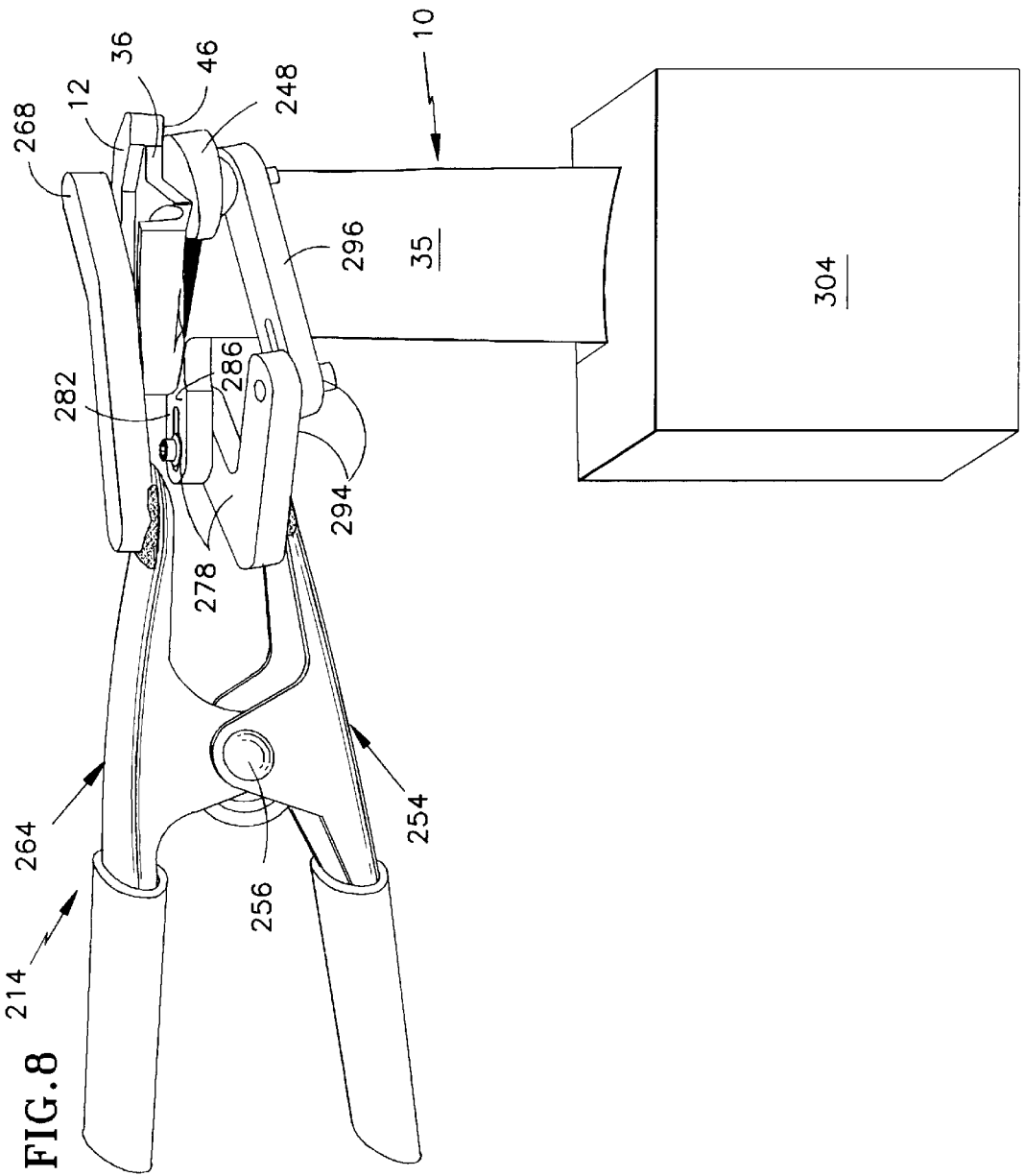

METHOD FOR APPLYING MATERIAL TO A FACE OF A FLOW DIRECTING ASSEMBLY FOR A GAS TURBINE ENGINE

CROSS-REFERENCE OF RELATED APPLICATIONS

This application relates to the following co-pending U.S. applications filed on even date herewith and commonly assigned to the assignee of the subject application: U.S. application Ser. No. 08/994,781, entitled A FIXTURE FOR USE IN DISPOSING A REGION OF MATERIAL ON THE SHROUD OF A ROTOR BLADE, by Ittleson et alia, and U.S. application Ser. No. 08/994,677, entitled CLAMPING FIXTURE FOR A ROTOR BLADE SHROUD, by Ittleson et alia.

TECHNICAL FIELD

This invention relates to axial flow rotary machines and more particularly to a method for forming the face of a shroud on a used or partially formed rotor blade for such a machine.

BACKGROUND OF THE INVENTION

Axial flow rotary machines, such as gas turbine engines used for the propulsion of aircraft, have rotor assemblies disposed within the engine. Each rotor assembly is used to transfer energy between the rotor assembly and gases flowed through the engine. The rotor assembly is commonly provided with rotor disks each having a plurality of rotor blades.

Each rotor blade typically has a root which adapts the blade to engage a corresponding groove in the disk for retention of the rotor blade. An airfoil extends outwardly from the root and has a convex side and a concave side for interacting with the working medium gases. The rotor blade may also be provided with a shroud, such as a tip shroud at the outer end of the airfoil. Each shroud has laterally (circumferentially) extending faces and axial extending faces. An example of an axially extending face is the notch face. The shroud extends circumferentially to engage the shroud of each of the adjacent rotor blades at the notch face.

During operation of the machine, the rotor blades in the turbine section extend outwardly across the working medium flow path. The rotor blades receive energy from the working medium flow path to drive the rotor assembly about its axis of rotation. In the compression section, the rotor blades transfer energy to the gases to compress the gases as the rotor blades are driven about the axis of rotation by the rotor assembly. As a result, the rotor blades and shrouds are subjected to fluctuating gas flows and high temperatures.

These fluctuating gas flows induce vibrations in the blades which are damped by sliding friction as the shrouds rub against each other. Such rubbing causes wear. The notch face of the shroud at the point of contact has a hard facing material to extend the life of the rubbing surfaces on new blades and is replaced on used blades after the notch becomes worn.

The present invention is concerned with a fixture and method for disposing shroud material, such as a weld material for hard facing a cross notch, on the substrate of a used rotor blade or on a new, rotor blade which is partially formed. Accordingly, the term "rotor blade" includes a partially formed rotor blade having a substrate that adapts the rotor blade shroud to receive such material, or is a used rotor blade having a portion of the shroud surface machined away to form a substrate prior to restoration of the rotor blade.

One method of providing hard facing material to a shroud is to melt hard face material at the notch face by passing an electrical current through the material, such as by welding. This results in a pool of molten material. The molten material is used to build up the thickness of material on the notch face as it hardens. Unfortunately, the pool of molten material coats the top of the shroud, coats the flow path surface beneath the shroud and extends radially past the notch face surface as it hardens.

It is relatively straight forward to remove the deposited material from the top of the shroud because this is not a flow path surface and is easily accessible during the rotor blade fabrication process. The underside of the shroud is a different matter because it includes hard face material protruding from the substrate and attached to the shroud. The protrusion adds weight to the shroud at a critical location and disrupts the aerodynamic smoothness of the flow path surface. The once molten material, now hardened into a lump of hard face material, is removed from the under side of the shroud to decrease rotational stresses in the shroud to acceptable levels and to form a surface having an acceptable aerodynamic smoothness.

One approach is to hand blend the weld material such as by use of a hand held belt sander or hand held surface grinder. Such work is time consuming, ergonomically undesirable and expensive. Machining is not an attractive alternative because of difficulty in locating a partially formed part, such as a rotor blade during manufacture, that has a substrate which receives the molten material. The typical method is to rigidly support the rotor blade for the machining operation by engaging the partially formed root of the rotor blade. A rotor blade with an unfinished roots is difficult to locate using the root as a datum for the machining operation because the location of the shroud then has much variability in a locating fixture. Using a cast block datum around the airfoil is an alternative, but the block prevents access to the underside of the shroud and prevents removing material from the flow path surface located there.

Accordingly, scientists and engineers working under the direction of Applicants' assignee, have sought to develop a method and an apparatus for use with the shrouds rotor blades which decreases the difficulties associated with removing hard face material from the flow path surface of the rotor blade shroud.

SUMMARY OF INVENTION

This invention is in part predicated on the recognition that a very small amount of hard face material may be tolerated on the flow path surface of the shroud providing its mass and its roughness and any protrusion from the surface into the flow path are no greater than limits which are much smaller than the protrusion that presently results from depositing hard face material. For example, for typical rotor blades it was recognized that a protrusion is acceptable providing the protrusion is no greater than ten thousandths of an inch (0.010") with a surface roughness Ra measurement of ninety to one-hundred and fifty (90–150) micro inches as measured in accordance with the procedures set forth in specification "ANSI B46.1—1985 Surface Texture" available from the American National Standards Institute.

According to the present invention, a method for forming a region of hardened material on the notch face location of a rotor blade includes melting hard face material at the notch face while urging a metal pad against the underside of the shroud to block the flow of molten material to the underside of the shroud.

In accordance with one embodiment of the present invention, the step of urging the pad against the shroud includes engaging the contour of the shroud with the contour of the pad.

In accordance with still another embodiment of the present invention, the step of urging the pad against the shroud includes applying a force along a line of force to the pad at a first location and rotating the pad with respect to the line of force to orient the pad substantially parallel to the underside of the shroud.

In accordance with one embodiment of the present invention, the step of urging a pad against the flow path surface of the shroud includes urging the pad with a resilient force such that the pad resists movement away from engagement with the flow path surface of the shroud with a restorative force.

In accordance with one embodiment of the present invention, the step of urging a pad against the flow path surface of the shroud includes engaging the rotor blade outwardly of the root section of the rotor blade to orient the pad with respect to the flow path surface of the shroud.

In accordance with one embodiment of the present invention, the step of engaging the rotor blade outwardly of the root section of the rotor blade to orient the pad with respect to the flow path surface of the shroud includes disposing support structure adjacent the rotor blade which engages the pad and engaging the shroud section of the rotor blade for supporting and positioning the pad from the shroud section.

In accordance with one embodiment of the present invention, the method includes transferring heat from the molten material adjacent the pad at a greater rate than the material adjacent the shroud and the step of blocking the flow of molten material to the flow path surface of the shroud includes the step of increasing the viscosity of the molten material adjacent the faying surfaces of the pad and shroud by transferring the heat at a greater rate from that location.

In accordance with one embodiment of the present invention, the step of transferring heat includes limiting the amount of heat transferred such that the pad does not act as a heat sink transferring too much heat out of the molten material and causing cracking of the molten material and heating the pad to a temperature which is less than one-third the melting point of the pad material.

In accordance with one embodiment of the present invention, the step of engaging the rotor blade with support structure includes orienting the support structure for the pad such that the support structure does not extend laterally beyond the pad and does not extend radially a substantial distance between the platform of the blade and the flow path surface of the shroud.

A primary feature of the present invention is the step of blocking molten material from flowing to the flowpath surface of a shroud. Another feature is avoiding heating the pad to a temperature which approaches its melting point. Another feature is transferring heat adjacent the faying surface of the pad with the shroud at a rate which is greater than at the shroud to increase the viscosity of the molten material at the pad location.

A principal advantage of the present invention is the efficiency and cost saving which results from eliminating the need to finish the flow path surface of the shroud by using a pad for blocking the flow of molten material from the flow path surface of the shroud or blocking molten material from extending toward the airfoil beyond the flow path surface of the shroud. Another advantage in one embodiment of the method is the ease and speed of installation of the pool of molten material to the pad and the blade shroud which results from orienting the support structure for the pad such that the support structure does not extend laterally beyond the pad and does not extend radially a substantial distance between the platform of the blade and the flow path surface of the shroud. An advantage is the quick seating of the pad against the flow path surface of the shroud in a faying relationship which results from contouring the pad to a contour which closely matches the flow path surface of the shroud and rotating the pad about an axis and inclining the axis with respect to the lateral direction of the shroud. An advantage is the durability and integrity of the weld material which results from limiting the amount of heat flowing to the pad to avoid a significant heat sink adjacent the hard face material. Still another advantage is the blockage of molten material which results from increasing the viscosity of the molten material by transferring heat at a greater rate than into the shroud.

BEST MODE FOR CARRYING OUT THE INVENTION

FIG. 1 is an exploded perspective view of a finished rotor blade 10 having a shroud 12; and, a fixture 14 for use in disposing a region of material to the shroud of a rotor blade. The finished blade is shown for purposes of explanation. The blade used with the fixture might be a used rotor blade or a new, partially formed rotor blade as discussed below.

The fixture is shown in exploded fashion to show the relationship of different elements of the fixture to faces 16, 18 of the rotor blade. The face of the rotor blade might extend laterally (circumferentially), such as the face 16, or might extend axially such as the notch face 18. The material is deposited on a substrate of a used rotor blade or on a partially formed rotor blade to form the faces of the shroud shown on the finished rotor blade. For example, parent material might be deposited on the lateral face and hard facing material deposited on the axial, cross notch face. Accordingly, references to the notch face and hardened material that follow are exemplary in nature and do not limit the scope of this disclosure.

The finished rotor blade is shown disposed about a spanwisely extending axis $L_s$. The following description, except for the substrate and notch face, is common to a finished, a partially finished, and a used rotor blade. The rotor blade has a first end 22 having a root section 24 and a platform section 26. The platform section has a first side 28 and a second side 32. The rotor blade has a second end 34. An airfoil section 35 having a length $L_a$ extends spanwisely from the first end to the second end. The second end includes the shroud. The shroud has a first side and a second side which extend laterally with respect to the airfoil.

FIG. 1A is an assembled view of the fixture shown in FIG. 1 and shows the fixture 14 in its operatively engaged position with a used or a partially formed rotor blade 10. The shroud of the partially formed blade has a substrate, such as a notch substrate 36, for receiving hardened material. A notch face location 38 is spaced laterally from the substrate. Hard faced material is applied to the substrate until the hard face material extends through and beyond the notch face location. Thereafter, the blade will be machined to its final form, with the finished notch face 18 on the rotor blade extending to and located at the notch face location 38.

As shown in FIG. 1 and FIG. 1A, the shroud has a flow path surface 42 having a first side 44 and a second side 46.

The fixture 14 has a pad 48 having a surface 50 and means, that is, an assembly, as represented by the assembly 52, for urging the pad into engagement with the flow path surface 42 of the shroud. The pad 48 has a surface 50 which adapts the pad to engage the flow path surface 42 of the shroud 12 of the rotor blade.

The fixture includes a base 54 which is adapted to engage the root section 24 of the rotor blade. The base has a passage 56 having an opening 58 which adapts the base to receive the first end 22 of the rotor blade. The base supports the rotor blade during operations that are performed on the shroud of the rotor blade. The base might be integrally formed with the assembly that urges the pad into engagement with the flow path surface 42 of the shroud, or the assembly urging the pad might be separately formed from the base as is shown in Applicants' application Ser. No. (EH-10129), entitled Clamping Fixture For A Rotor Blade Shroud, by Ittleson et alia, the material of which is incorporated herein by reference and is discussed with regard to FIGS. 6, 7 and 8.

The base has a first surface 60 facing outwardly and bounding a portion of the passage. A second surface 62 disposed across the passage faces outwardly and bounds a portion of the passage. The surfaces adapt the fixture to engage the sides 28,32 of the platform section 26 of the rotor blade 10 in its unfinished condition. The opening of the passage extends inwardly from the first surface and the second surface and adapts the base to receive the root section 24 of the rotor blade.

The base is provided with a clamp 64 having a pair of arms 66,68 extending laterally. The arms are spaced apart leaving a gap G therebetween which adapts the clamp to extend on either side of the airfoil section 35 of the rotor blade. Each of the arms has a projection 72,74 which extends from the arms. The projections adapt the arms to each engage one of the sides of the platform section of the rotor blade. In the operative condition as shown in FIG. 1A, the platform section is trapped between the arms of the clamp and the outwardly facing first and second surfaces 60,62 of the opening 58.

A screw fastener 76 has a rod 78 that threadably engages the base 54 for urging the arms 66,68 of the clamp against the platform section of the rotor blade. The screw fastener has a head 82. A spacer 84 has a first end 86 which engages the arms of the clamp and a second end 88 which is adapted to engage the head of a screw fastener. The spacer further has an opening which extends from the first end to the second end of the spacer and which adapts the spacer to receive the rod of the screw fastener. In an alternate construction, the screw fastener is made as a one piece assembly having a spacer integral with the head of the screw fastener.

A channel 92 extends inwardly from the opening 58. A ground assembly 94 includes a grounding block 96 disposed in the channel. The grounding block is adapted to engage the root section 24 of the rotor blade element during the welding operation. An elastic element, as represented by the spring 98, is adapted to exert a force against the grounding block to urge the grounding block into abutting contact with the rotor blade under operative conditions. Alternatively, the elastic element might be a pneumatic or hydraulic device.

As shown in FIG. 1 and in FIG. 1A with an unfinished rotor blade 10, a housing assembly 52 is the assembly for urging the pad into engagement with the flow path surface of the shroud section of an unfinished rotor blade. Alternatively, the assembly might be a clamp construction as shown in U.S. Application Ser. No. (EH-10129), or any another construction which is able to urge a pad against the underside of the flow path surface of the shroud. Examples are pneumatic or hydraulic devices attached to a base or to the rotor blade for support or independent of both.

The housing assembly has a passage 102 having a first end 104 and a second end 106. The second end has an opening 108. An elastic element, such as a spring 112, is disposed in the passage. The spring has a first end 114 which engages the first end of the passage and a second end 116 which faces outwardly. A bar 118 is disposed in the passage. The bar 118 has a first end 122 which engages the elastic element and a second end 124 extending beyond the passage. The second end has a channel 126 which adapts the bar to receive an arm.

An arm 128 extends through the channel 126 of the bar 118 to slidably engage the bar. FIG. 2 shows the pad 48 in the engaged position and the pad 48a in the non-engaged position. The arm is moveable outwardly by movement of the bar and laterally by releasing a fastener 132 to enable movement of the arm in the directions shown in FIG. 2. The screw fastener threadably engages the bar and extends through the channel. The screw fastener exerts a force on the arm to secure the arm against movement once the arm is adjusted to the correct lateral location, as shown in FIG. 2.

FIG. 3 is a side elevation view of the shroud 12, of the pad 48, and of the arm 128 of the assembly 52 for urging the pad into engagement with the flow path surface of the shroud. The arm of the assembly 52 has opening 142 bounded by a first surface 144 having the contour of a portion of a sphere and a cylindrical surface 146 which extends from the first surface. The cylindrical surface is disposed about an axis Ar. The axis A, extends through the center of the sphere.

The pad 48 has a first surface 148 having the contour of a portion of a sphere. The first surface rotatably engages the spherically shaped surface 144 of the arm 128. A cylindrical shaft 152 extends from the first surface. The cylindrical shaft has a axis rotation of $A_s$. The axis of rotation $A_s$ is alignable with the axis $A_r$ of the opening in the arm such that the shaft is disposed in the opening and spaced radially from the cylindrical surface of the arm. This enables the pad to displace itself slightly by inclining the axis $A_s$ or rotating about the axis $A_s$.

The surface 50 of the pad is a second surface on the pad 48 having a contour which closely matches the contour of the flow path surface 42 of the shroud. The second surface adapts the pad to engage the flow path surface of the shroud and extends laterally beyond the hard face location of the shroud and beyond the edge of the shroud such that the pad in the engaged position blocks the flow of molten material to the flow path surface of the shroud. Thus, the second surface closely matches the contour of the shroud to an extent which avoids deposition of an unacceptable amount of material on the flow path surface of the shroud and insures that any deposition is within acceptable limits set by aerodynamic and structural concerns. As will be realized, in some embodiments the amount of deposition may require a small amount of rework to bring the flow path surface within acceptable limits. This might occur if the second surface was deliberately contoured to provide this result for reasons unconnected with aerodynamic or structural concerns.

FIG. 4 schematically represents the deposition of the hard face material 154 at the notch face location 38 on the shroud. As shown in FIG. 4, suitable welding wire 156 is in contact with the molten material 154. An arc of a welding torch 158 is used to supply electrical current and heat to the weld wire and hard face material to cause melting of the weld wire and hard face material adjacent the notch face location.

FIG. 5 shows the hard face material 154 at the end of the deposition process. The hard face material is shown extending above a portion of the shroud. The hard face material only extends below a portion of the shroud to a slight extent as a result of the faying relationship between the pad 48 and the underside 42 of the shroud. The amount of material which may extend under the shroud after use of the pad is so small that it results in a projection of acceptable size that does not require further rework. For example, in one particular trial, the projection without the pad (see FIG. 9) was nearly one-sixteenth of an inch (0.0625") and commonly an eighth of one inch (0.125") depending on the skill of the welder. Using the pad with hundreds of rotor blades having a lengths varying from about three (3) inches to twelve (12) inches resulted in a projection that was less than ten thousandths of an inch (0.010") with a surface roughness measurement Ra that is less than the range of ninety to one-hundred and fifty micro inches (90–150 micro inches). This projection was aerodynamically acceptable and does not require further finishing of the flow path surface of the shroud. In fact, in many applications, the projection was less than five-thousandths of an inch with a surface roughness measurement Ra that was less than seventy micro-inches.

FIGS. 6, 7 and 8 are a view of an alternate embodiment of the construction shown in FIGS. 1 and 1A. In this embodiment, the rotor blade is supported by a separate base 304.

As shown in FIG. 6 and FIG. 7, the shroud has a flow path surface 42 having a first side 44 and a second side 46. The fixture 214 has a pad 248 having a surface 250 and an assembly, as represented by the assembly 252, for urging the pad into engagement with the flow path surface 42 of the shroud. The assembly has a pair of jaws 254,264 which rotatably engage each other at a pivot 256. The pair of jaws is formed of the first jaw 254 having a first end 258 and a second end 262; and, the second jaw 264 having a first end 266 and a second end 268. The jaws are disposed about and moveable toward an axis $A_j$ of the assembly by an element, as represented by the spring element 272, for urging the first end of the jaws apart and the second end of the jaws together.

The first jaw has a first side 274. The first side has a pin 276 and a pair of spaced apart surfaces 278. A first appendage 282 is disposed between the surfaces. The appendage has a slot 284 in which the pin is disposed such that the appendage is slidably and rotatably attached to the jaw to permit movement in the axial $D_a$ and lateral $D_l$ directions. The first appendage has a surface 286. The surface 286 adapts the appendage to engage the flow path surface 42 on the first side 44 of the shroud 12.

The first jaw 254 has a second side 288. The second side has a pin 292 and a pair of spaced apart surfaces 294 as does the first side 274 of the jaw. A second appendage 296 is disposed between the spaced apart surfaces on the second side. The second appendage has a slot 298 in which the pin 292 is disposed such that the appendage is slidably and rotatably attached to the jaw and permits movement in the axial and lateral directions.

The second jaw 264 of the assembly 252 faces oppositely to the first and second sides 274,288 of the first jaw 254. The second jaw at the second end 268 is disposed laterally between the first side 274 and the second side 288 of the first jaw. The second jaw has a surface 302 which adapts the second jaw to engage the non-flow path side of the shroud.

As shown in FIG. 7, the pin 276 has been loosened and the first appendage 282 rotated and moved laterally and axially with respect to the first side 274 of the first jaw 254 such that the surface 286 of the appendage engages the underside or flow path surface 42 of the first side 44 of the shroud 12. Similarly, the second appendage 296 has been adjusted such that the attached pad 248 is in its operative position. The surface 250 of the pad engages the flow path surface of the shroud. The surface 250 has two points a,b on the surface which, with a point c on the surface of the first appendage, define a plane which is substantially parallel to the flow path surface of the shroud. The pad extends laterally beyond the notch face location 38 of the shroud 12 (the distance between the notch face location 38 and the substrate 36 is exaggerated) to engage the flow path surface 42 of the shroud and beyond the shroud such that the pad in the engaged position is adapted to block the flow of molten material to the flow path surface of the shroud.

FIG. 8 is a side view of the fixture 214 and the unfinished (partially formed) rotor blade 10 shown in FIG. 2 in the engaged position. FIG. 8 shows the appendages 282,296, of the fixture engaging the lateral sides 44,46 of the flow path surface 42 of the shroud. In addition, FIG. 8 shows a base 304 for engaging the rotor blade 10 to support the rotor blade as the hard facing operation takes place.

During operation of the fixture shown in FIGS. 1 and 1A, rotor blade after rotor blade is installed in the fixture and welded. Each blade is quickly removed and a new blade installed by releasing the threaded fastener and tightening it. The rotor blade is positioned by the platform section which, compared to the root section in a partially finished blade, is a much better datum. The arm 128 and bar 118 which engage the spring 112 are easily moved, compressing the spring. The pad is moved into position against the new blade, with compression of the spring accommodating differences in height between rotor blades. These differences might occur for the same type of rotor blade or for different types of rotor blades as the new blade is installed because of the partially formed nature of the blade and slight differences in orientation of the blade in the fixture. A new type of rotor blade may require a different size pad 48 which is easily installed by releasing the threaded fastener 132, sliding the arm out of engagement and disposing a new arm with a pad attached in the fixture or simply removing the clip retainer from the shaft 152 of the pad and replacing the small pad with a larger pad.

The pad 48 is easily and quickly adjusted into a faying relationship with the underside of the flow path surface of the shroud by reason of its ability to rotate about axis $A_s$ and to incline slightly with respect to the axis $A_r$ of the opening in the arm 128 of the assembly 52. Thus, the pad is quickly seated in the event that engagement of the clamp with the platform section of the rotor blade has caused a small misalignment of the rotor blade in the fixture. A particular advantage is the engagement of the airfoil outwardly of the partially formed root. This eliminates variations in engagement associated with such a root and speeds set up time in the fixture.

The thermal conductivity of the pad 48 is greater than the thermal conductivity of the hard face material 154 and the shroud 12. A tungsten pad, which has been used to good effect, has a thermal conductivity that is normally four times greater than the thermal conductivity of the molten material and the shroud at operative temperatures. As the weld material 154 is deposited on the pad at the hard face location, the pad conducts the heat away from the molten material adjacent the line of faying contact between the shroud and the pad at a faster rate than at the shroud. This causes the molten material to become more viscous at that location, blocking the leakage of molten material to the flow path surface of the shroud. The thermal capacitance of the shroud (the mass of the material multiplied by the specific heat at constant pressure) is established such that the pad does not act as a heat sink of such a size that cracking of molten material occurs as it cools. Thus, even though the thermal conductivity is high with respect to the material on the shroud, the thermal capacitance of the pad is such that cracking of the molten material is avoided.

The melting point of the pad is greater than the melting point of the shroud or the molten material. This avoids attaching the pad to the shroud. A melting point of two, three or four times the molten material is desirable to provide a factor of safety. In fact, a tungsten pad will have a melting point that is about four times the melting point of the molten material.

A particular advantage of the present invention is avoiding or reducing the necessity of finishing the flow path surface of the shroud. Hand grinding and hand sanding of the flow path surface of the shroud is one way of removing excess molten material which cannot be tolerated for aerodynamic purposes. This is an undesirable operation in terms of time and impact on personnel performing the operation. The repetitive motion of moving the grinding wheel with respect to the surface to obtain an acceptable finish without damaging the flow path surface of the shroud may adversely effect muscles and tendons of the arm required to repeatedly perform that motion. In addition, even the most conscientious and most skilled personnel may occasionally injure the flow path surface of the shroud by over grinding or over sanding the flow path surface of the shroud resulting in scrapping of the part.

A particular advantage of the construction shown in FIGS. 6, 7 and 8 is the orientation of the assembly 252 for urging the pad into engagement with the shroud. For example, the spanwise length of the assembly is about six tenths of an inch below the shroud. The fixture leaves free and unencumbered the region between the fixture and the airfoil which amounts to at least seventy-percent of the region for an airfoil of about three inches to nearly ninety-five percent for an airfoil of about twelve inches. In addition, the fixture does not extend beyond the pad. This provides room for the welder to manipulate the welding device and facilitates welding.

After completion of the deposition of the hard face material, the rotor blade is removed from the fixture, encapsulated in a block of material to provide datum for the machining operations and machined to its final contour at the root platform and shroud sections of the rotor blade. Alternatively, the airfoil might be fixtured in a hard point fixture which engages other datums on the airfoil.

Although the invention has been shown and described with respect to detailed embodiments thereof, it should be understood by those skilled in the art that various changes in form and detail thereof may be made without departing from the spirit and the scope of the claimed invention.

We claim:

1. A method for disposing a region of material at a shroud face location for a rotor blade, the rotor blade having a root section, a platform section, an airfoil section extending spanwisely outwardly from the root section, a shroud section extending laterally with respect to the airfoil, the shroud section being formed of a first material and having a shroud face location and a substrate for receiving a material and having a flow path surface which faces the platform section of the airfoil, comprising:

forming a pool of molten material adjacent the substrate by melting material at the substrate location on the shroud which includes flowing a portion of molten material toward the flowpath surface of the shroud;

blocking the flow of molten material to the flow path surface of the shroud by urging a pad against the flow path surface of the shroud which closely conforms to the contour of the flow path surface;

cooling the molten material and shroud while urging the pad against the flow path surface of the shroud to contact at least part of the molten material and until the molten material is no longer in a molten state.

2. The method for disposing a region of material at a shroud face location for a rotor blade of claim 1 wherein the step of urging a pad against the flow path surface of the shroud includes urging the pad with a resilient force such that the pad resists movement away from engagement with the flow path surface of the shroud with a restorative force.

3. The method for disposing a region of material at a shroud face location for a rotor blade of claim 1 wherein the step of urging a pad against the flow path surface of the shroud includes engaging the rotor blade outwardly of the root section of the rotor blade to orient the pad with respect to the flow path surface of the shroud.

4. The method for disposing a region of material at a shroud face location for a rotor blade of claim 3 wherein the step of engaging the rotor blade outwardly of the root section of the rotor blade to orient the pad with respect to the flow path surface of the shroud includes disposing support structure adjacent the rotor blade which engages the pad and engaging the platform section of the rotor blade for supporting and positioning the pad from the platform section of the rotor blade.

5. The method for disposing a region of material at a shroud face location for a rotor blade of claim 3 wherein the step of engaging the rotor blade outwardly of the root section of the rotor blade to orient the pad with respect to the flow path surface of the shroud includes disposing support structure adjacent the rotor blade which engages the pad and engaging the shroud section of the rotor blade for supporting and positioning the pad from the shroud section.

6. The method for disposing a region of material at a shroud face location for a rotor blade of claim 1 wherein the step of urging a pad against the flow path surface of the shroud includes disposing a metal pad adjacent the flow path surface of the shroud having a thermal conductivity that is greater than the thermal conductivity of the shroud and molten material and wherein the step of cooling the molten material includes transferring heat from the molten material adjacent the shroud and pad at a greater rate than the material adjacent the shroud and wherein the step of blocking the flow of molten material to the flow path surface of the shroud includes the step of increasing the viscosity of the molten material adjacent the faying surfaces of the shroud by transferring the heat at a greater rate from that location than adjacent locations adjacent only to the shroud.

7. The method for disposing a region of material at a shroud face location for a rotor blade of claim 6 wherein the step of urging a pad against the flow path surface of the shroud includes disposing a metal pad adjacent the flow path surface of the shroud having a predetermined thermal capacitance and wherein the step of transferring heat includes limiting the amount of heat transferred such that the pad does not act as a heat sink transferring too much heat out of the molten material and causing cracking of the molten material.

8. The method for disposing a region of material at a shroud face location for a rotor blade of claim 1 wherein the step of urging a pad against the flow path surface of the shroud includes disposing a metal pad adjacent the flow path surface of the shroud having a predetermined thermal capacitance and wherein the step of transferring heat includes limiting the amount of heat transferred such that the pad does not act as a heat sink transferring too much heat out of the molten material and causing cracking of the molten material.

9. The method for disposing a region of material at a shroud face location for a rotor blade of claim 5 wherein the step of engaging the rotor blade with support structure includes orienting the support structure for the pad such that the support structure does not extend laterally beyond the pad and does not extend radially a substantial distance between the platform of the blade and the flow path surface of the shroud.

10. A method for disposing a region of material at a shroud face location for a rotor blade, the rotor blade having a root section, a platform section, an airfoil section extending spanwisely outwardly from the root section, a shroud section extending laterally with respect to the airfoil, the shroud section being formed of a first material and having a shroud face location and a substrate for receiving a material and having a flow path surface which faces the platform section of the airfoil, comprising:

forming a pool of molten material adjacent the substrate by melting material at the substrate location on the shroud;

blocking the flow of molten material to the flow path surface of the shroud by urging a pad against the flow path surface of the shroud which closely conforms to the contour of the flow path surface and which extends beyond the shroud;

cooling the molten material and shroud while urging the pad against the flow path surface of the shroud until the molten material is no longer in a molten state;

wherein the pad has at least one axis of rotation and wherein the step of urging a pad against the flow path surface of the shroud includes the step of rotating the metal pad about at least one axis of the pad as the metal pad engages the shroud such that the contour of the pad is closely matched to the contour of the underside of the shroud in a faying relationship.

11. The method for disposing a region of material at a shroud face location for a rotor blade of claim 10 wherein the axis is inclinable with respect to the surface of the shroud and wherein the step of rotating the metal pad about at least one axis of the pad includes inclining the axis of rotation with respect to the flow path surface of the shroud.

12. The method for disposing a region of material at a shroud face location for a rotor blade of claim 1 wherein the step of cooling the molten material includes transferring heat from the molten material adjacent the shroud and pad to the pad and heating the pad to a temperature which is less than one-half the melting point of the pad.

13. The method for disposing a region of material at a shroud face location for a rotor blade of claim 1 wherein the step of cooling the molten material includes transferring heat from the molten material adjacent the shroud and pad to the pad and heating the pad to a temperature which is less than one-half the melting point of the pad.

14. The method for disposing a region of material at a shroud face location for a rotor blade of claim 3 wherein the step of cooling the molten material includes transferring heat from the molten material adjacent the shroud and pad to the pad and heating the pad to a temperature which is less than one-half the melting point of the pad.

15. The method for disposing a region of material at a shroud face location for a rotor blade of claim 4 wherein the step of cooling the molten material includes transferring heat from the molten material adjacent the shroud and pad to the pad and heating the pad to a temperature which is less than one-half the melting point of the pad.

16. The method for disposing a region of material at a shroud face location for a rotor blade of claim 5 wherein the step of cooling the molten material includes transferring heat from the molten material adjacent the shroud and pad to the pad and heating the pad to a temperature which is less than one-half the melting point of the pad.

17. The method for disposing a region of material at a shroud face location for a rotor blade of claim 6 wherein the step of cooling the molten material includes transferring heat from the molten material adjacent the shroud and pad to the pad and heating the pad to a temperature which is less than one-half the melting point of the pad.

18. The method for disposing a region of material at a shroud face location for a rotor blade of claim 7 wherein the step of cooling the molten material includes transferring heat from the molten material adjacent the shroud and pad to the pad and heating the pad to a temperature which is less than one-half the melting point of the pad.

19. The method for disposing a region of material at a shroud face location for a rotor blade of claim 8 wherein the step of cooling the molten material includes transferring heat from the molten material adjacent the shroud and pad to the pad and heating the pad to a temperature which is less than one-half the melting point of the pad.

20. The method for disposing a region of material at a shroud face location for a rotor blade of claim 9 wherein the step of cooling the molten material includes transferring heat from the molten material adjacent the shroud and pad to the pad and heating the pad to a temperature which is less than one-half the melting point of the pad.

21. The method for disposing a region of material at a shroud face location for a rotor blade of claim 10 wherein the step of cooling the molten material includes transferring heat from the molten material adjacent the shroud and pad to the pad and heating the pad to a temperature which is less than one-half the melting point of the pad.

22. The method for disposing a region of material at a shroud face location for a rotor blade of claim 11 wherein the step of cooling the molten material includes transferring heat from the molten material adjacent the shroud and pad to the pad and heating the pad to a temperature which is less than one-half the melting point of the pad.

23. A method for disposing a region of hardened material at the notch face location for a rotor blade, the rotor blade having a root section, a platform section, an airfoil section extending spanwisely outwardly from the root section, a shroud section extending laterally with respect to the airfoil, the shroud section being formed of a first material, having a substrate which adapts the rotor blade to receive a hardened material and a notch face location for engaging an associated face location on an adjacent airfoil, and having a flow path surface which faces the platform section of the airfoil, comprising:

engaging the platform section of the rotor blade on opposite sides of the platform section to restrain the rotor blade against movement;

electrically grounding the rotor blade though the root section of the airfoil;

melting hard face material at the shroud notch face location by welding a second material to the shroud which includes the step of passing a direct current electrical arc through the shroud notch face location to form, the second material having a hardness at operative conditions that is greater than the hardness of the first material;

blocking the flow of molten second material to the flow path surface of the shroud by urging a metal pad against the flow path surface of the shroud while welding the second material to the shroud notch face, the metal pad having at least one axis of rotation, and including the step of rotating the metal pad about at least one axis of the pad as the metal pad engages the shroud such that the contour of the pad is matched to the contour of the underside of the shroud in a faying relationship and such that the metal pad extends beyond the shroud to block the flow of molten second material to the flow path surface of the shroud and which includes the step of increasing the viscosity of the molten material adjacent the faying surfaces of the shroud and pad by disposing a pad having a higher thermal conductivity than the molten material and the shroud.

24. The method for disposing a region of hard face material at a shroud face location for a rotor blade of claim 23 wherein the step of cooling the molten material includes transferring heat from the molten material adjacent the shroud and pad to the pad and heating the pad to a temperature which is less than one-half the melting point of the pad.

25. The method of disposing a region of material at a shroud face location for a rotor blade of claim 1 wherein the step of urging a pad against the flow path surface of the shroud includes disposing a pad adjacent the shroud which extends beyond the shroud.

* * * * *